(12) United States Patent
Kado et al.

(10) Patent No.: US 10,124,525 B2
(45) Date of Patent: Nov. 13, 2018

(54) METHOD OF MANUFACTURING LAMINATED STRUCTURE

(71) Applicant: TOYOTA JIDOSHA KABUSHIKI KAISHA, Toyota-shi, Aichi-ken (JP)

(72) Inventors: Hiroyasu Kado, Seto (JP); Fuminori Ohashi, Toyota (JP); Makoto Fujiuchi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 82 days.

(21) Appl. No.: 15/211,436

(22) Filed: Jul. 15, 2016

(65) Prior Publication Data
US 2017/0021537 A1    Jan. 26, 2017

(30) Foreign Application Priority Data

Jul. 21, 2015    (JP) .................................. 2015-144247

(51) Int. Cl.
| | |
|---|---|
| *B29C 47/06* | (2006.01) |
| *H01M 2/16* | (2006.01) |
| *H01M 2/14* | (2006.01) |
| *H01M 4/04* | (2006.01) |
| *H01M 10/04* | (2006.01) |
| *H01M 10/052* | (2010.01) |
| *B29K 105/16* | (2006.01) |

(Continued)

(52) U.S. Cl.
CPC .......... *B29C 47/065* (2013.01); *H01M 2/145* (2013.01); *H01M 2/1673* (2013.01); *H01M 4/0411* (2013.01); *H01M 10/04* (2013.01); *H01M 10/0459* (2013.01); *B29K 2105/16* (2013.01); *B29L 2009/00* (2013.01); *B29L 2031/3468* (2013.01); *B32B 37/15* (2013.01); *B32B 2457/10* (2013.01); *H01M 10/052* (2013.01)

(58) Field of Classification Search
None
See application file for complete search history.

(56) References Cited

U.S. PATENT DOCUMENTS

| 4,911,628 A | * | 3/1990 | Heilmayr | ............... B29C 47/065 |
|---|---|---|---|---|
| | | | | 264/173.12 |
| 2010/0015267 A1 | * | 1/2010 | Keller | ................. B29C 47/0014 |
| | | | | 425/113 |

FOREIGN PATENT DOCUMENTS

| CN | 102333636 A | 1/2012 |
|---|---|---|
| JP | 1-103421 A | 4/1989 |

(Continued)

*Primary Examiner* — Timothy Kennedy
(74) *Attorney, Agent, or Firm* — Sughrue Mion, PLLC

(57) ABSTRACT

A laminated structure is manufactured using an extruder die in which an ejection port is provided, the laminated structure including a core layer, a first surface layer, and a second surface layer. The extruder die includes a first surface layer material conveyance path through which a raw material of the first surface layer is conveyed, a second surface layer material conveyance path through which a raw material of the second surface layer is conveyed, and a core layer material conveyance path through which a raw material of the core layer is conveyed. The paths merge at the ejection port. The extruder die has a shape in which a downstream portion downstream of a merging location that is the ejection port does not contact the injected laminated structure formed of the raw materials. The laminated structure is injected by causing viscous fluids as the raw materials into the paths, respectively.

3 Claims, 7 Drawing Sheets

(51) Int. Cl.
*B29L 9/00* (2006.01)
*B29L 31/34* (2006.01)
*B32B 37/15* (2006.01)

(56) References Cited

FOREIGN PATENT DOCUMENTS

| | | |
|---|---|---|
| JP | 09-213347 A | 8/1997 |
| JP | 2000-182657 A | 6/2000 |
| JP | 2002-334689 A | 11/2002 |
| JP | 2003-103547 A | 4/2003 |
| JP | 3584109 B2 | 11/2004 |
| JP | 2014-203561 A | 10/2014 |
| KR | 2000-0019951 A | 4/2000 |

* cited by examiner

METHOD OF MANUFACTURING LAMINATED STRUCTURE

INCORPORATION BY REFERENCE

The disclosure of Japanese Patent Application No. 2015-144247 filed on Jul. 21, 2015 including the specification, drawings and abstract is incorporated herein by reference in its entirety.

BACKGROUND OF THE INVENTION

1. Field of the Invention

The invention relates to a method of manufacturing a laminated structure in which a plurality of layer parts are stacked. More specifically, the invention relates to a method of manufacturing a laminated structure, which allows the laminated structure to be manufactured with the use of a relatively simple mechanism and which imparts excellent stability to the thicknesses of respective layers of the manufactured laminated structure.

2. Description of Related Art

Conventionally, a laminated structure has been used in various fields. For example, in the field of batteries, an electrode laminated body is used as an electric power generation element. An electrode laminated body of a battery is usually obtained by stacking three kinds of layers, namely, a positive electrode layer, a negative electrode layer and a separator layer such that the positive electrode layer and the negative electrode layer do not directly contact each other. In general, the electrode laminated body is manufactured by superimposing a positive electrode plate, a negative electrode plate and a separator film on each other, and winding them. As an example of a device that has been conventionally employed for the superimposition and winding, an electrode group extruder die device is described in Japanese Patent Application Publication No. 2000-182657 (JP 2000-182657 A). In the device described in this document, sheet elements, that is, a positive electrode, a negative electrode and a separator are wound while a back tension is applied thereto, for the purpose of preventing the occurrence of winding deviation in a wound electrode group.

However, the above-described conventional art has the following problem. The configuration of the electrode group extruder die device is complicated. According to the above-described document, the electrode group extruder die device includes chucks for holding the respective sheet elements. The chucks for the positive electrode, the negative electrode and the separator are required. In particular, two pairs of the chucks are required for the separator. Furthermore, the chucks are provided with guide rails respectively. Each of the guide rails is directed in a radial direction around a winding location. Each of the chucks can slide on a corresponding one of the guide rails. Thus, while a rear end of each of the sheet elements is held by a corresponding one of the chucks, each of the chucks slides on a corresponding one of the guide rails, so a back tension is applied to each of the sheet elements at the time of winding. As described hitherto, such a complicated mechanism is required.

SUMMARY OF THE INVENTION

The invention provides a method of manufacturing a laminated structure, which can be performed with the use of a simple mechanism and which does not cause a lamination failure such as winding deviation.

An aspect of the invention relates to a method of manufacturing a laminated structure. The laminated structure is manufactured with use of a extruder die in which an ejection port is provided, through ejection of raw materials from the ejection port, the laminated structure including a core layer, a first surface layer that is stacked on one surface of the core layer, and a second surface layer that is stacked on another surface of the core layer. The extruder die includes a first surface layer material conveyance path through which the raw material of the first surface layer is conveyed toward the ejection port, a second surface layer material conveyance path through which the raw material of the second surface layer is conveyed toward the ejection port, and a core layer material conveyance path through which the raw material of the core layer is conveyed toward the ejection port, the core layer material conveyance path being provided between the first surface layer material conveyance path and the second surface layer material conveyance path; the core layer material conveyance path, the first surface layer material conveyance path and the second surface layer material conveyance path merge at the ejection port; the extruder die has a shape in which a downstream portion does not contact the ejected laminated structure formed of the raw materials, the downstream portion being downstream of a merging location that is the ejection port, with respect to flow of the raw materials; and the laminated structure in which the raw material of the first surface layer, the raw material of the core layer, and the raw material of the second surface layer are stacked in a layered manner is ejected from the ejection port by causing a viscous fluid as the raw material of the first surface layer, a viscous fluid as the raw material of the second surface layer, and a viscous fluid as the raw material of the core layer to flow into the first surface layer material conveyance path, the second surface layer material conveyance path, and the core layer material conveyance path, respectively.

In the method of manufacturing the laminated structure according to the above-described aspect of the invention, the raw material of the first surface layer, which is a viscous fluid, is supplied to the first surface layer material conveyance path of the extruder die. Similarly, the raw material of the second surface layer and the raw material of the core layer, which are both viscous fluids, are supplied to the second surface layer material conveyance path and the core layer material conveyance path, respectively. Then, the three raw materials flow toward the ejection port through the conveyance paths in the extruder die, respectively, and merge at the ejection port. Therefore, the laminated structure in which the three layers are stacked is ejected from the ejection port. The ejected laminated structure formed of the raw materials advances without coming into contact with the downstream portion of the extruder die, the downstream portion being downstream of the ejection port. Therefore, since, for example, friction with the extruder die does not occur after ejection, the thicknesses of the respective layers of the laminated structure are stable, regardless of differences among the supply pressures of the raw materials.

In the method according to the above-described aspect of the invention, an intersection angle between the core layer material conveyance path and the first surface layer material conveyance path at the merging location may be equal to or smaller than 45°, and an intersection angle between the core layer material conveyance path and the second surface layer material conveyance path at the merging location may be equal to or smaller than 45° in the extruder die. With this configuration, the intersection angles at the merging location are small, and therefore, the flow of each raw material at the merging location is unlikely to be disordered (disturbed).

In the method according to the above-described aspect of the invention, ejection may be performed in a state where a difference between a supply pressure of the raw material of the first surface layer supplied to the first surface layer material conveyance path and a supply pressure of the raw material of the core layer supplied to the core layer material conveyance path is set equal to or lower than a first upper-limit pressure difference that depends on a deformation-withstanding pressure at a location between the core layer material conveyance path and the first surface layer material conveyance path in an upstream portion upstream of the merging location in the extruder die, and a difference between a supply pressure of the raw material of the second surface layer supplied to the second surface layer material conveyance path and the supply pressure of the raw material of the core layer supplied to the core layer material conveyance path is set equal to or lower than a second upper-limit pressure difference that depends on a deformation-withstanding pressure at a location between the core layer material conveyance path and the second surface layer material conveyance path in the upstream portion upstream of the merging location in the extruder die. With this configuration, it is possible to prevent occurrence of a situation where the extruder die is partially deformed due to the pressure differences among the conveyance paths at the time of ejection. Therefore, it is possible to inject the laminated structure with thicknesses equal to or close to the aimed thicknesses.

In the method according to the above-described aspect of the invention, in the extruder die, the ejection port may be defined by inclined surfaces configured such that a gap between the inclined surfaces widens toward a downstream side in the downstream portion downstream of the merging location with respect to the flow of the raw materials. The use of this extruder die makes it possible to more reliably ensure that the laminated structure ejected from the ejection port does not come into contact with the extruder die.

A manufacturing method according to another aspect of the invention is suited to manufacture a laminated structure including a core layer, a first surface layer that is stacked on one surface of the core layer, and a second surface layer that is stacked on another surface of the core layer, the first surface layer having a plurality of comb tooth portions that protrude toward the core layer and the second surface layer, the second surface layer having a plurality of comb tooth portions that protrude toward the core layer and the first surface layer. The first surface layer and the second surface layer are disposed such that the comb tooth portions of the first surface layer and the comb tooth portions of the second surface layer are alternately arranged. The core layer is disposed between the first surface layer and the second surface layer, and has a zigzag shape such that the first surface layer and the second surface layer do not come into direct contact with each other. When this laminated structure is applied to, for example, an electrode laminated body of a battery, it is possible to obtain a large facing area where electrode layers face each other, and excellent stability in the thicknesses of the respective layers and the amounts of protrusion of the comb tooth portions. Therefore, the battery has excellent performance.

According to each of the above-described aspects of the invention, there is provided the method of manufacturing the laminated structure, which can be performed with the use of a simple mechanism and which does not cause a lamination failure such as winding deviation.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

An embodiment of the invention will be described in detail hereinafter with reference to the accompanying drawings. In the present embodiment, the invention is embodied as a method of manufacturing an electrode laminated body of a lithium-ion secondary battery or another battery, in which a positive electrode layer, a separator layer and a negative electrode layer are stacked, through ejection extruder die with the use of a extruder die, and a device that performs the method.

Figure 1:
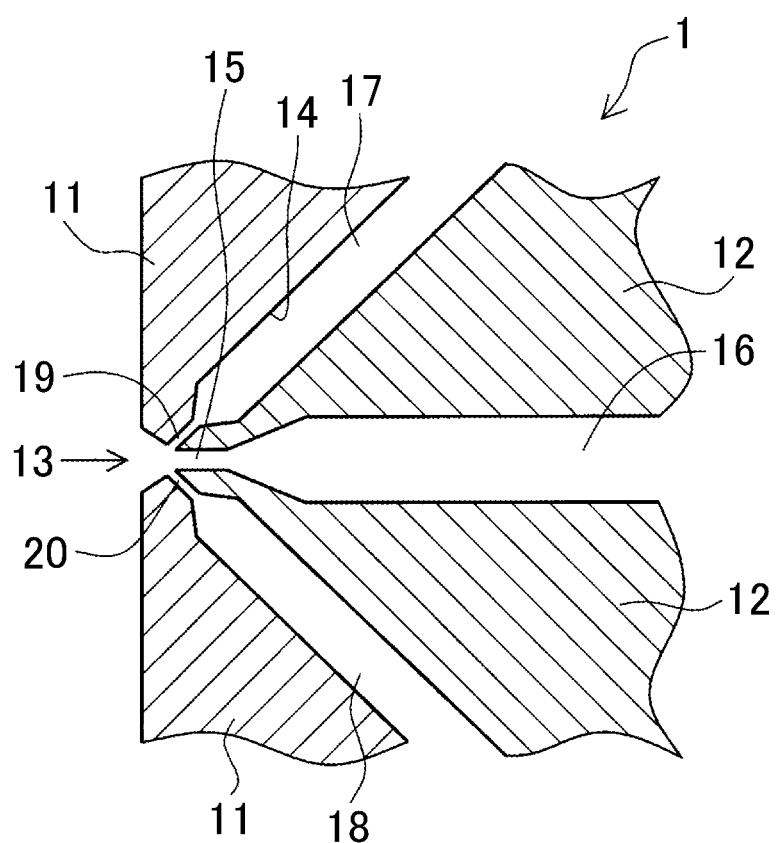
FIG. 1 is a sectional view of a extruder die according to an embodiment of the invention.

First of all, the extruder die used in the present embodiment of the invention will be described. FIG. 1 is a sectional view showing a main part of a extruder die 1 according to the present embodiment of the invention. The extruder die 1 according to the present embodiment of the invention shown in FIG. 1 includes an outer extruder die 11 and an inner extruder die 12. The outer extruder die 11 constitutes the contour of the extruder die 1. A cavity portion 14 and an opening portion 13 are formed in the outer extruder die 11. The cavity portion 14 is a space for accommodating the inner extruder die 12 therein, and is connected with an outer space through the opening portion 13. The inner extruder die 12 is accommodated in the cavity portion 14 of the outer extruder die 11, and has a shape that is pointed at a left end thereof in FIG. 1. Furthermore, a hollow core material pool 16 and a hollow core material path 15 are formed inside the inner extruder die 12. The core material pool 16 and the core material path 15 are connected with each other, and extend through the inner extruder die 12 in a lateral direction in FIG. 1 as a whole. The core material pool 16 is wider (larger) than the core material path 15.

In a state in which the inner extruder die 12 is inserted in the outer extruder die 11 as shown in FIG. 1, spaces of the cavity portion 14 are respectively formed above and below the inner extruder die 12 in FIG. 1. These space regions are referred to as a first surface layer material pool 17 and a second surface layer material pool 18. A first surface layer material path 19 that is narrower than the first surface layer material pool 17 is formed between the first surface layer material pool 17 and the opening portion 13. The first surface layer material pool 17 is connected with the opening portion 13 via the first surface layer material path 19. Similarly, a second surface layer material path 20 that is narrower than the second surface layer material pool 18 is formed between the second surface layer material pool 18 and the opening portion 13. The second surface layer material pool 18 and the opening portion 13 are connected with each other. In the state shown in FIG. 1, three paths, namely, the first surface layer material path 19, the core material path 15 and the second surface layer material path 20 merge at the opening portion 13. Both the outer extruder die 11 and the inner extruder die 12 are depicted as if they were each divided into two parts, namely, an upper part and a lower part in FIG. 1. In fact, each of both the outer extruder die 11 and the inner extruder die 12 is one integral extruder die including the upper part and the lower part, as a whole.

Figure 2:
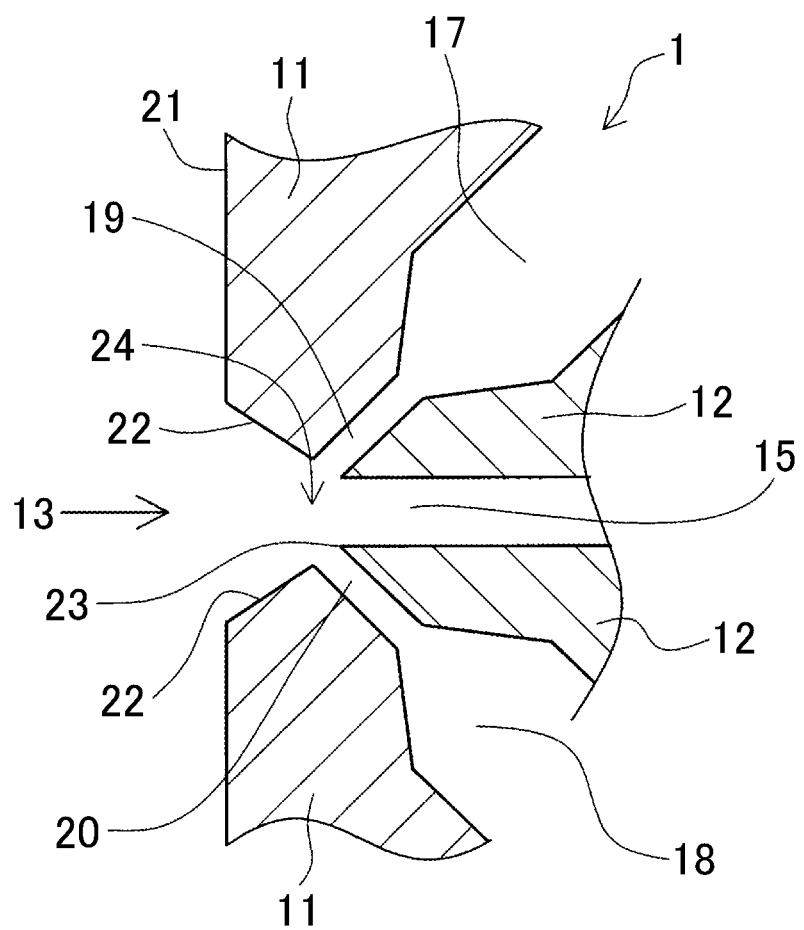
FIG. 2 is a sectional view showing a part of the extruder die of FIG. 1 in an enlarged manner.

FIG. 2 shows the opening portion 13 and the vicinity of the opening portion 13 in the extruder die 1 shown in FIG. 1 in an enlarged manner. As shown in FIG. 2, a V-shaped V-groove 22 is formed in an outer surface 21 of the outer extruder die 11 at the location of the opening portion 13. At the location of the V-groove 22, part of the outer surface 21 of the outer extruder die 11 is configured as inclined surfaces on upper and lower sides in FIG. 2, and the gap between the inclined surfaces widens in an outward direction, namely, a leftward direction in FIG. 2. As described above, the three paths, namely, the first surface layer material path 19, the core material path 15 and the second surface layer material path 20 merge at a bottom portion 24 of the V-groove 22. Therefore, in the state in which the inner extruder die 12 is combined with the outer extruder die 11, a tip portion 23 of the inner extruder die 12 faces the opening portion 13. In the opening portion 13, the inclined surfaces defining the V-groove 22 are provided in a portion outside the bottom portion 24 (in other words, the inclined surfaces defining the V-groove 22 are outside the bottom portion 24 and adjacent to the bottom portion 24).

Figure 3:
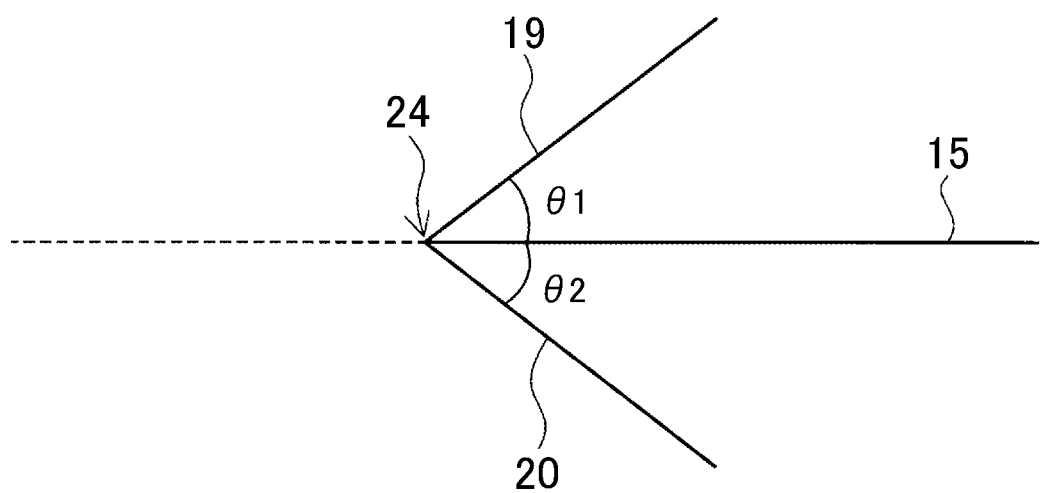
FIG. 3 is a schematic view illustrating how paths merge at an opening portion of the extruder die.

FIG. 3 is a schematic view showing the merging of the three paths at the position of the opening portion 13. Line segments "15", "19" and "20" in FIG. 3 represent centerlines of the respective paths, namely, the core material path 15, the first surface layer material path 19 and the second surface layer material path 20 in FIG. 2. As shown in FIG. 3, the centerlines 19, 15 and 20 intersect with each other at the position of "24". "24" in FIG. 2 means the bottom portion 24 of the opening portion 13. Moreover, each of intersection angles θ1 and θ2 of the centerlines 19 and 20 with respect to the centerline 15 is equal to or smaller than 45°. The intersection angle θ1 is generally equal to the intersection angle θ2 (θ1=θ2), though the intersection angle θ1 does not necessarily need to be equal to the intersection angle θ2.

Figure 4:
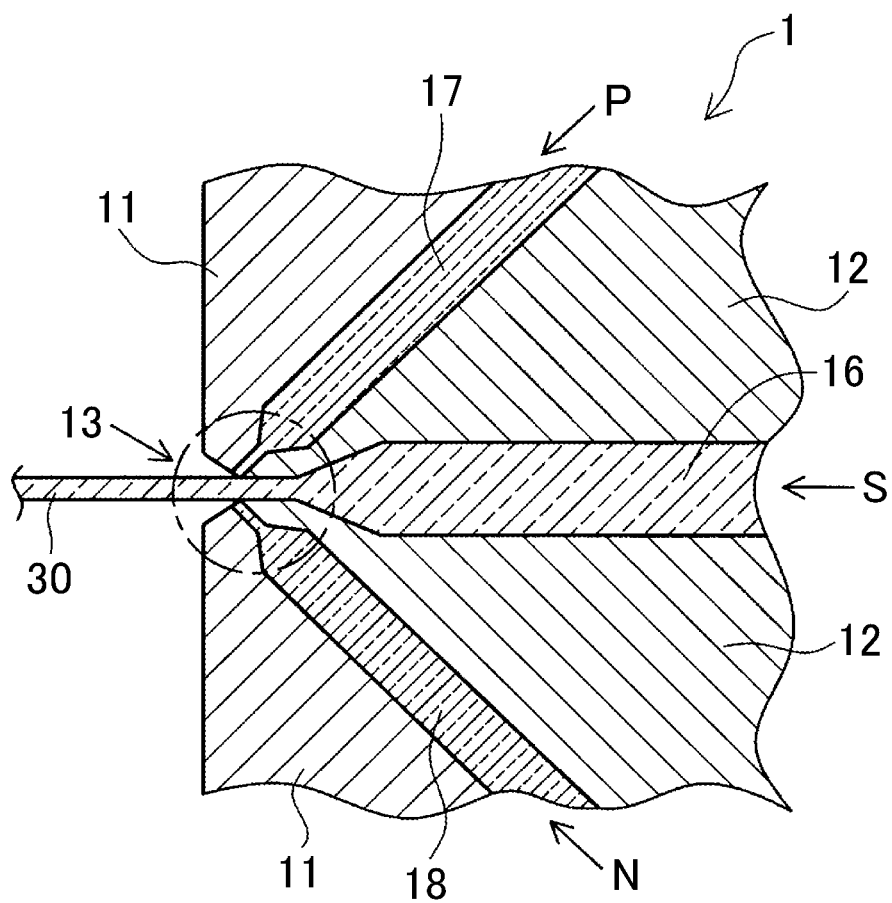
FIG. 4 is a sectional view showing how a laminated structure is manufactured by the extruder die of FIG. 1.

In the case where an electrode laminated body is manufactured with the use of the extruder die 1, each of pastes is prepared by dispersing, into a dispersion medium, a powder of a raw material of a corresponding one of three layers, namely, the separator layer, the positive electrode layer, and the negative electrode layer, and these pastes are pressed into the core material pool 16, the first surface layer material pool 17 and the second surface layer material pool 18. More specifically, as shown in FIG. 4, a positive electrode paste P is pressed into the first surface layer material pool 17, a negative electrode paste N is pressed into the second surface layer material pool 18, and a separator paste S is pressed into the core material pool 16. Thus, an electrode laminated body 30 in which the three layers are stacked is ejected leftward in FIG. 4 from the opening portion 13.

As the positive electrode paste P and the negative electrode paste N for use, for example, pastes described in the paragraph [0026] to [0031] of Japanese Patent Application Publication No. 2014-203561 (JP 2014-203561 A) can be used. It should be noted, however, that the amount of a binder component in this kind of known composition may be made smaller in the present embodiment of the invention than that described in the aforementioned publication. Alternatively, the binder component may not be used. On the other hand, the amount of a conductive agent component may be made larger in the present embodiment of the invention than that described in the aforementioned publication. As the separator paste S, a paste that is obtained by dispersing a silica powder or another ceramic powder into a dispersion medium in a colloidal manner and appropriately adjusting the viscosity may be used. A paste that is obtained by dispersing a resin powder instead of the ceramic powder may also be used.

Figure 5:
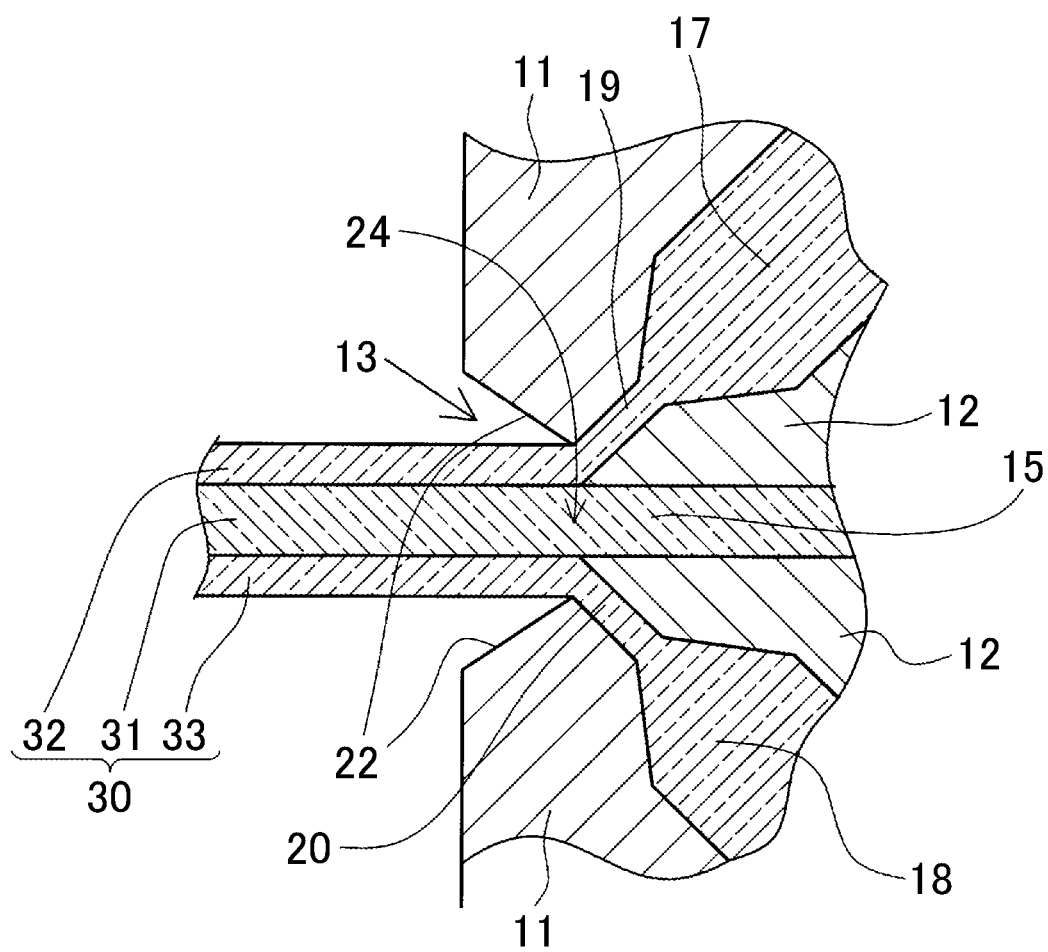
FIG. 5 is a sectional view showing a part of FIG. 4 in an enlarged manner.

FIG. 5 shows part of FIG. 4 in an enlarged manner, that is, in the same manner as in FIG. 2. As shown in FIG. 5, in the electrode laminated body 30, a positive electrode layer 32, a separator layer 31 and a negative electrode layer 33 are stacked. The positive electrode layer 32 is formed using the positive electrode paste P, the negative electrode layer 33 is formed using the negative electrode paste N, and the separator layer 31 is formed using the separator paste S.

The electrode laminated body 30 that has just been ejected from the opening portion 13 is in a state where the positive electrode layer 32, the separator layer 31 and the negative electrode layer 33 are all wet with the dispersion medium remaining. The dispersion medium is removed through an appropriate drying process, and thus, the electrode laminated body 30 is dried. In the dried electrode laminated body 30, since the dispersion medium has been removed, each of the layers is a porous layer resulting from the gaps among particles of the powder of the raw material. Due to the entry of an electrolytic solution into these gaps, the electrode laminated body 30 can function as an electric power generation element of a battery. This dried electrode laminated body 30 is enclosed in a case together with the appropriate electrolytic solution, and the positive electrode layer 32 and the negative electrode layer 33 are connected to corresponding external terminals. Thus, the battery is obtained.

FIG. 5 shows that the first surface layer material path 19, the core material path 15 and the second surface layer material path 20 merge at the location of the bottom portion 24 of the opening portion 13. This feature has been described with reference to FIG. 3. Thus, the positive electrode paste P, the separator paste S and the negative electrode paste N meet at the location of the bottom portion 24. Moreover, as soon as the three pastes meet, the surface of the electrode laminated body 30 separates from the outer extruder die 11, due to the inclined surfaces of the V-groove 22 of the opening portion 13. That is, after the three layers merge, the electrode laminated body 30 advances leftward in FIG. 5 without moving along the surface of the outer extruder die 11.

Figure 6:
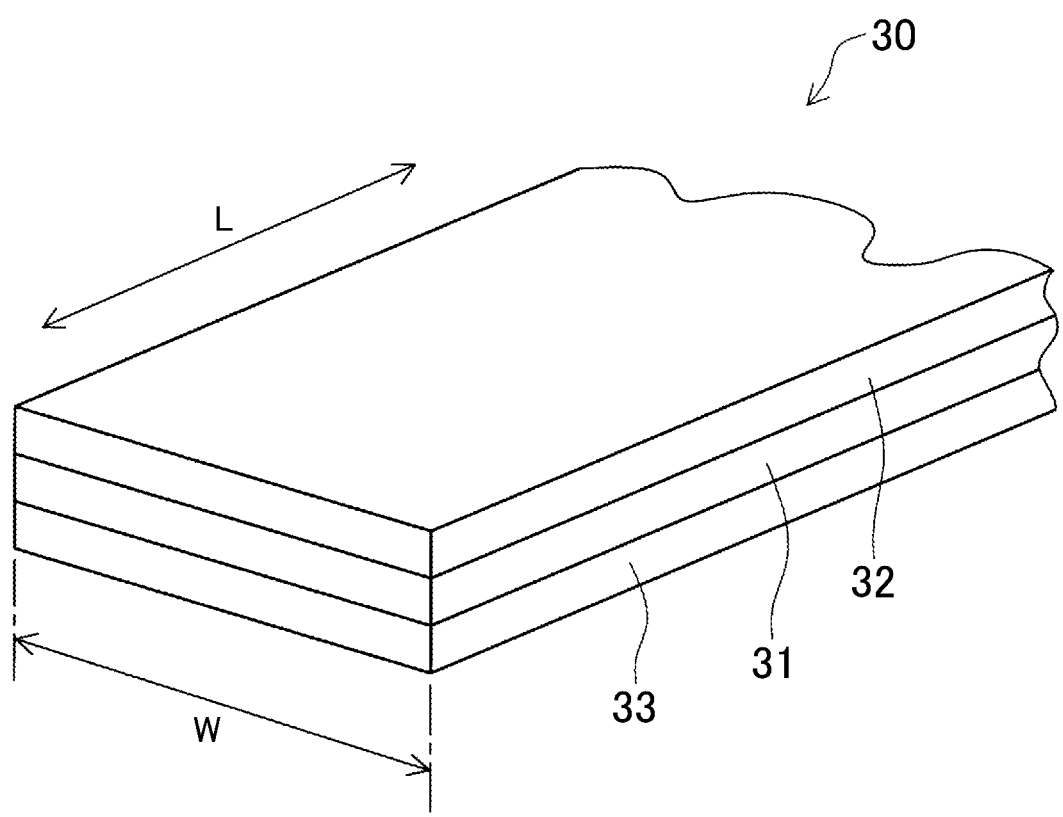
FIG. 6 is a perspective view of a manufactured electrode laminated body (the laminated structure)

In this manner, the electrode laminated body 30 having the three layers, namely, the positive electrode layer 32, the separator layer 31 and the negative electrode layer 33 as shown in FIG. 6 is obtained. Thus, the extruder die 1 according to the present embodiment of the invention has a structure shown in FIGS. 1 and 2 over an overall width W of the electrode laminated body 30. In each of the outer extruder die 11 and the inner extruder die 12 in FIG. 1 (and FIG. 2), the upper part and the lower part in a region outside the overall width W are connected with each other to be integrated. The electrode laminated body 30 that is manufactured according to the present embodiment of the invention is, as a matter of course, free from the problem of winding deviation, unlike the case of the winding method described in the section of the background of the invention.

A relationship between the discharge pressures of the respective pastes and the deformation-withstanding pressure of the extruder die 1 will now be described. The deformation-withstanding pressure matters to the inner extruder die 12 of the extruder die 1. This is because the tip portion 23 of the inner extruder die 12 has a shape that is pointed at a sharp angle, and is sandwiched between the paths of the different pastes, as is apparent from FIGS. 2 and 5. Therefore, if the pressure difference between the first surface layer material path 19 and the core material path 15 or the pressure difference between the second surface layer material path 20 and the core material path 15 is extremely high, the tip portion 23 of the inner extruder die 12 may be deformed. Therefore, the substantial widths of the respective paths are not equal to set widths, and the electrode laminated body 30 with the thicknesses of the respective layers different from the intended (aimed) thicknesses is obtained.

Therefore, in the present embodiment of the invention, the electrode laminated body 30 may be manufactured with the differences among the supply pressures of the respective pastes set equal to or lower than a predetermined value. More specifically, both the supply pressure of the positive electrode paste P and the supply pressure of the negative electrode paste N are set within a predetermined range with respect to the supply pressure of the separator paste S. Thus, the pressure difference between the first surface layer material path 19 or the second surface layer material path 20 and the core material path 15 can be made equal to or lower than a predetermined upper-limit pressure difference. The permitted upper-limit pressure difference depends on the material of the inner extruder die 12 and the angle of the tip portion 23 thereof. When the inner extruder die 12 is made of a material with a high deformation-withstanding pressure, the upper-limit pressure difference is high. When the inner extruder die 12 is made of a material with a low deformation-withstanding pressure, the upper-limit pressure difference is low. The deformation-withstanding pressure of a material is the maximum pressure that the material can withstand without being deformed. The upper-limit pressure difference decreases as the sharpness of the shape of the tip portion 23 increases (i.e., the corresponding intersection angle (a corresponding one of $\theta 1$ and $\theta 2$ of FIG. 3) between the paths decreases). In the case where the material of the inner extruder die 12 is a generally employed extruder die steel and the intersection angle (each of $\theta 1$ and $\theta 2$ of FIG. 3) between the paths is approximately 40° to 45°, the upper-limit pressure difference is, for example, approximately 1 MPa. The supply pressures themselves of the respective pastes are preferably within a range of approximately 1 MPa to 4 MPa.

Thus, the present embodiment of the invention has the following features. First of all, the thicknesses of the respective layers (the positive electrode layer 32, the separator layer 31 and the negative electrode layer 33) in the formed electrode laminated body 30 are stable. Secondly, the ratios among the thicknesses of the respective layers can be adjusted according to the manufacturing condition at the time of manufacture, without impairing the stability of the thicknesses. Thirdly, the amount of foreign matters interposed among the layers is extremely small. Fourthly, the adhesion among the layers is sufficient.

The first feature will be described. The stability of the thicknesses of the respective layers mentioned herein means that there is almost no variation of the thicknesses of the respective layers among the individual electrode laminated bodies, and that there is almost no variation of the thicknesses of the respective layers within each individual electrode laminated body. There are two reasons why this stability is obtained. The first reason lies in the intersection angles among the core material path 15, the first surface layer material path 19 and the second surface layer material path 20 at a merging point. As described with reference to FIG. 3, these three paths merge into a single path at the bottom portion 24 of the opening portion 13. Moreover, the angles at which the flow directions of the positive electrode paste P and the negative electrode paste N change at the merging location (i.e., the bottom portion 24) depend on the intersection angles $\theta 1$ and $\theta 2$, and hence are equal to or smaller than 45°. The flow direction of the separator paste S does not change. As described hitherto, the changes in the flow directions of the respective pastes at the merging point are small, and therefore, it is possible to avoid the situation where the flow of each paste is disordered (disturbed) due to merging. Therefore, there is no factor for causing fluctuations of the thicknesses of the respective formed layers.

The other reason lies in the immediate separation of the electrode laminated body 30 from the surface of the outer extruder die 11 after merging. If the electrode laminated body 30 moves while being in contact with the surface of the outer extruder die 11 for a while after merging, the electrode laminated body 30 receives, during the movement thereof, a friction resistance due to the surface of the outer extruder die 11. This friction resistance is applied to the positive electrode layer 32 and the negative electrode layer 33 without being applied to the separator layer 31, and hence may be a cause of the rippling of interlayer interfaces (i.e., the friction resistance may cause formation of waves of interlayer interfaces). Further, if the discharge pressures of the pastes for the respective layers are different from each other, the discharge pressures may influence each other among the layers.

The present embodiment of the invention does not cause this phenomenon, and the electrode laminated body 30 immediately separates from the surface of the outer extruder die 11 after merging. Accordingly, the electrode laminated body 30 ejected to the outside from the bottom portion 24 of the opening portion 13 is in fact in a pressure release state. In consequence, even when there is a certain difference among the supply pressures of the respective pastes supplied to the respective paths of the extruder die 1, there is no factor for causing the rippling of the interlayer interfaces or causing deviations in the thicknesses of the layers from the aimed thicknesses. Thus, the electrode laminated body 30 with the stable thicknesses of the respective layers is obtained. Therefore, in the present embodiment of the invention, basically, the thicknesses of the respective layers can be set by adjusting the clearances of the first surface layer material path 19, the core material path 15 and the second surface layer material path 20 in the extruder die 1.

Subsequently, the second feature will be described. In the present embodiment of the invention, the ratios among the thicknesses of the respective layers can be adjusted while maintaining the configuration of the extruder die 1, by adjusting the extrusion speeds of the pastes of the respective layers. For example, when all the extrusion speeds of the pastes of the respective layers are the same, the ratios among the thicknesses of the respective layers basically reflect the above-described ratios among the clearances of the respective paths directly. A case is assumed in which the extrusion speeds of the positive electrode paste P and the negative electrode paste N are maintained, and only the extrusion speed of the separator paste S is reduced to half. In this case, in the obtained electrode laminated body 30, the thicknesses of the positive electrode layer 32 and the negative electrode layer 33 are substantially unchanged and only the thickness of the separator layer 31 is reduced to substantially half. This is because the separator layer 31 is elongated under the influence of the extrusion speeds of the positive electrode paste P and the negative electrode paste N at both ends, although the amount of the separator paste S discharged per unit time is reduced to half. As a matter of course, the thicknesses of the respective layers are stable for the above-described reason even when the manufacturing is performed in the above-described case.

The third feature is based on a comparison with the case where an electrode group is formed according to the winding method described in the section of the background of the invention. In the winding method, the possibility of occurrence of a situation where foreign matters in air are sandwiched between sheets superimposed on each other and wound is not zero, whereas this situation does not occur in the method according to the present embodiment of the invention. The fourth feature is ascribable to the fact that the three layers have already been stacked at the time of ejection from the extruder die 1. Sufficient adhesion is unlikely to be obtained especially in the case where the viscosities of the pastes are high in a method in which the respective layers are stacked and closely attached to each other after ejection. However, such a problem does not occur in the present embodiment of the invention. Accordingly, it is possible to obtain the electrode laminated body 30 in which adhesion among the layers is high while using the pastes having high viscosities at which a problem due to turbidity among the pastes does not occur.

In the present embodiment of the invention, the example in which the three layers are stacked has been described. However, the invention is not limited to the case where three layers are stacked, and the invention may also be applied to cases where a larger number of layers are stacked. Besides, it is possible to employ modes where lamination locations (i.e., locations where layers are stacked) are added in a lateral direction of the lamination plane, in addition to the mode where lamination locations are added in a thickness direction of the lamination plane.

Figure 7:
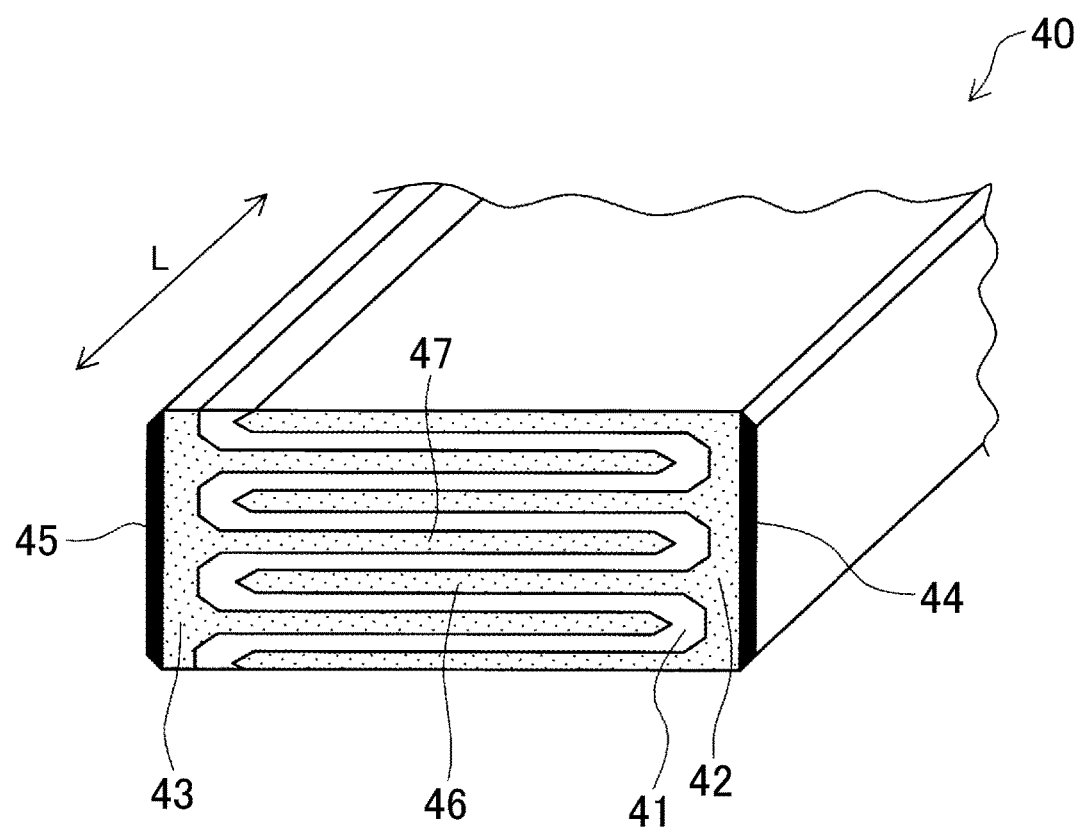
FIG. 7 is a perspective view of an electrode laminated body according to a modification example.

FIG. 7 shows a modification example of the electrode laminated body that is manufactured by the method according to the present embodiment of the invention. In an electrode laminated body 40 of FIG. 7, each of a positive electrode layer 42 and a negative electrode layer 43 has a comb-teeth shape in a sectional view. The positive electrode layer 42 and the negative electrode layer 43 are disposed such that a plurality of comb tooth portions 46 and 47 thereof are alternately arranged. A separator layer 41 between the positive electrode layer 42 and the negative electrode layer 43 has a zigzag shape. Due to the presence of this separator layer 41, the positive electrode layer 42 and the negative electrode layer 43 are prevented from coming into direct contact with each other, as in the above-described case of the electrode laminated body 30. This electrode laminated body 40 can be obtained by modifying the structure of the extruder die. As a matter of course, the sectional shape depicted at the front in FIG. 7 remains unchanged regardless of the position in a longitudinal direction L of the electrode laminated body 40. The electrode laminated body 40 of FIG. 7 further includes collector terminals 44 and 45.

It should be noted, however, that the collector terminals 44 and 45 are attached afterward separately from ejection of the positive electrode layer 42, the negative electrode layer 43 and the separator layer 41.

In the electrode laminated body 40 shown in FIG. 7, the positive electrode layer 42 and the negative electrode layer 43 have a large facing area (i.e., an area where the positive electrode layer 42 and the negative electrode layer 43 face each other is large), because of the comb-teeth shape of the positive electrode layer 42 and the negative electrode layer 43. This means that the battery fabricated through the use of the electrode laminated body 40 has a large battery capacity. Besides, this means that the battery has a small internal resistance. Therefore, the battery obtained through the use of the electrode laminated body 40 exhibits excellent properties. Further, an electrode laminated body for a single battery can be obtained by cutting the electrode laminated body 40 at any location in the longitudinal direction L, and the same holds true for the electrode laminated body 30 of FIG. 6. Further, the thicknesses and protrusion amounts of the comb tooth portions 46 and 47 and the thickness of the separator layer 41 are also highly stable as in the case of the electrode laminated body 30.

As described above in detail, according to the present embodiment of the invention, the electrode laminated body (the laminated structure) is manufactured through ejection with the use of the extruder die 1. The extruder die 1 used for this purpose is configured such that the three paths, namely, the first surface layer material path 19, the core material path 15 and the second surface layer material path 20 merge at the bottom portion 24 of the opening portion 13. Thus, when the positive electrode paste P, the separator paste S and the negative electrode paste N meet at the bottom portion 24 to constitute the three-layer laminated body, this laminated body immediately separates from the outer extruder die 11 and advances. Thus, it is possible to realize the method of manufacturing the laminated structure by which the electrode laminated bodies 30 and 40 with stable thicknesses of the respective layers are obtained.

The embodiment of the invention is merely an example, and the invention is not limited to the present embodiment. Accordingly, the embodiment of the invention can be subjected to various improvements and modifications without departing from the scope of the invention. For example, in the embodiment, the inclined surfaces defining the V-shaped groove are provided to form the shape of the portion of the opening portion 13, the portion being outside the bottom portion 24. However, the invention is not limited to this configuration. The configuration in which "the gap widens toward the downstream side" may be provided by using a notch shape instead of the inclined surfaces defining the groove.

The above-described embodiment of the invention is intended for the electrode laminated body 30 or 40 in which the core layer is the separator layer 31 or 41, the first surface layer is the positive electrode layer 32 or 42, and the second surface layer is the negative electrode layer 33 or 43, but the invention is not limited to an electrode laminated body of a battery. The invention can be applied to objects with a laminated structure having at least three layers. For example, the invention can be applied to a capacitor laminated body having conductor layers that serve as a first surface layer and a second surface layer, and an insulating layer that serves as a core layer therebetween. Further, the invention is also applicable to various electronic components other than the capacitor laminated body. Further, each of the pastes used as raw materials is not limited to a paste obtained by dispersing a powder in a dispersion medium, and may be a synthetic resin paste or the like, depending on the intended purpose of the laminated structure to be manufactured.

What is claimed is:

1. A method of manufacturing a laminated structure comprising manufacturing the laminated structure with use of an extruder die in which an ejection port is provided, through ejection of raw materials from the ejection port, the laminated structure including a core layer, a first surface layer that is stacked on one surface of the core layer, and a second surface layer that is stacked on another surface of the core layer, wherein:

the extruder die includes a first surface layer material conveyance path through which the raw material of the first surface layer is conveyed toward the ejection port, a second surface layer material conveyance path through which the raw material of the second surface layer is conveyed toward the in ejection port, and a core layer material conveyance path through which the raw material of the core layer is conveyed toward the ejection port, the core layer material conveyance path being provided between the first surface layer material conveyance path and the second surface layer material conveyance path;

the core layer material conveyance path, the first surface layer material conveyance path and the second surface layer material conveyance path merge at the ejection port;

the extruder die has a shape in which a downstream portion does not contact the ejected laminated structure formed of the raw materials, the downstream portion being downstream of a merging location that is the ejection port, with respect to flow of the raw materials; and the laminated structure in which the raw material of the first surface layer, the raw material of the core layer, and the raw material of the second surface layer are stacked in a layered manner is ejected from the ejection port by causing a viscous fluid as the raw material of the first surface layer, a viscous fluid as the raw material of the second surface layer, and a viscous fluid as the raw material of the core layer to flow into the first surface layer material conveyance path, the second surface layer material conveyance path, and the core layer material conveyance path, respectively, wherein in the extruder die, the ejection port is defined inclined surfaces configured such that a gap between the inclined surfaces widens toward a downstream side in the downstream portion downstream of the merging location with respect to the flow of the raw materials.

2. The method of manufacturing the laminated structure according to claim 1, wherein an intersection angle between the core layer material conveyance path and the first surface layer material conveyance path at the merging location is equal to or smaller than 45°, and an intersection angle between the core layer material conveyance path and the second surface layer material conveyance path at the merging location is equal to or smaller than 45° in the extruder die.

3. The method of manufacturing the laminated structure according to claim 1, wherein ejection is performed in a state where a difference between a supply pressure of the raw material of the first surface layer supplied to the first surface layer material conveyance path and a supply pressure of the raw material of the core layer supplied to the core layer material conveyance path is set equal to or lower than a first upper-limit pressure difference that depends on a deformation-withstanding pressure at a location between the core layer material conveyance path and the first surface layer material conveyance path in an upstream portion upstream of the merging location in the extruder die, and a difference between a supply pressure of the raw material of the second surface layer supplied to the second surface layer material conveyance path and the supply pressure of the raw material of the core layer supplied to the core layer material conveyance path is set equal to or lower than a second upper-limit pressure difference that depends on a deformation-withstanding pressure at a location between the core layer material conveyance path and the second surface layer material conveyance path in the upstream portion upstream of the merging location in the extruder die.

* * * * *